S. P. ROBERTS.
REIN PROTECTOR.
APPLICATION FILED NOV. 28, 1908.
978,650.
Patented Dec. 13, 1910.
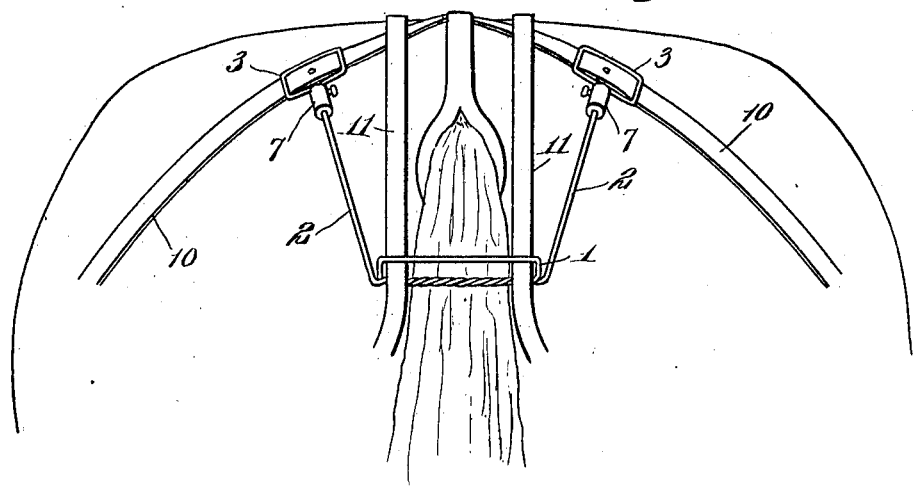
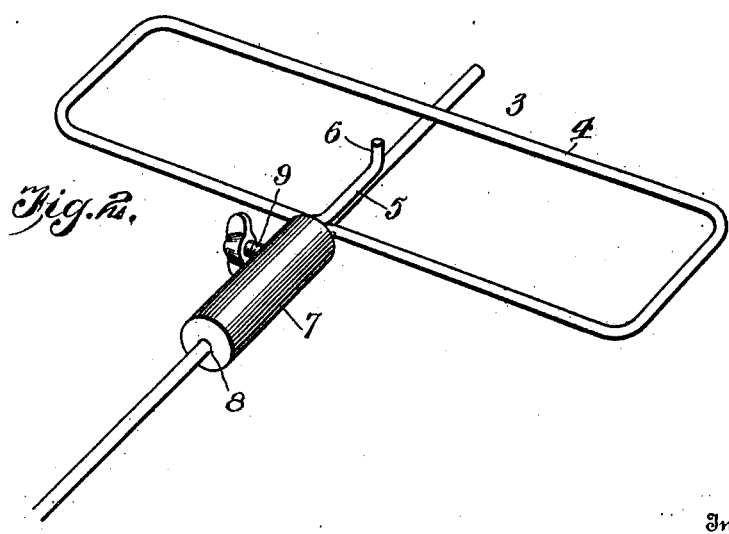
Witnesses
Louis R. Heinrichs
D. H. Gould.
Inventor
Solomon P. Roberts
By Victor J. Evans
Attorney

UNITED STATES PATENT OFFICE.

SOLOMON P. ROBERTS, OF ROCKPORT, WEST VIRGINIA.

REIN-PROTECTOR.

978,650.     Specification of Letters Patent.     Patented Dec. 13, 1910.

Application filed November 28, 1908. Serial No. 464,908.

*To all whom it may concern:*

Be it known that I, SOLOMON P. ROBERTS, a citizen of the United States, residing at Rockport, in the county of Wood and State of West Virginia, have invented new and useful Improvements in Rein-Protectors, of which the following is a specification.

The invention relates to an improvement in rein protectors, being more particularly directed to a device adapted to prevent the catching of the rein beneath the tail of the animal.

The main object of the present invention is the provision of a protector designed to receive the reins in a manner to permit independent movement of either while at the same time forming a bridge between the reins to render it impossible for the animal to catch either rein beneath the tail.

The invention will be described in the following specification, reference being had particularly to the accompanying drawing, in which:—

Figure 1 is a view illustrating the construction and application of my improvement. Fig. 2 is an enlarged perspective of one of the supporting hinges, one end of the protector being shown in place.

Referring particularly to the accompanying drawings, wherein is illustrated the preferred form of the present invention, the improved protector is preferably made up of a single length of material, as wire centrally bent and intertwisted to form an elongated loop 1, from which the wire is projected in the form of rods 2, each of which extends from one end of the loop for an appropriate length. As a means for supporting the protector in a manner to permit the disposition of the loop 1 in proper relation to the tail of the animal I provide what I term supporting members 3, including a rectangular body 4 formed of a single length of material, one end of which at a point centrally at one side of the body is projected within the plane of the body, as at 5, and at a point centrally within said body is terminally provided with an upwardly extending stud 6. The opposing end of the wire length forming the supporting member is projected outwardly and connected to a sleeve 7, formed with a longitudinal bore 8 within which bore a set screw 9 is adapted to project under certain manipulation of the screw. The supporting members 3 are secured to the backband straps 10 of the harness with the sleeves 7 so disposed as to receive the terminals of the arms 2 from the protector. The supporting members are secured in place to the straps 10 by forming said straps at appropriate intervals with openings to receive the studs 6, the wire length 5 underlying the strap while the end bars of the rectangular body overlie the same, as clearly shown in Fig. 1. The supporting members are thus in the forms of buckles carrying sleeves in which the arms of the protector are fitted.

It will, of course, be understood that the supporting member 3 and parts carried thereby are to be as small and inconspicuous as possible commensurate with the desired strength and when in place the protector proper is applied by inserting the ends 2 in the sleeves 7 and adjusting said arms until the loop 1 of the projector is disposed about seven inches in rear of the root of the tail of the animal. After this adjustment said screws 9 are tightened to maintain the loop in proper position. The reins 11 are passed through the loop 1, and it will be obvious that the loop forms a bridge between the reins immediately in rear of the root of the tail of the animal, so that it is practically impossible for the animal to so elevate the tail as to raise it above either rein, as in the act of elevating the tail the latter will contact with the loop, raising the same and thereby maintaining both reins above the tail at all times.

The device as a whole provides for that adjustment of the loop or protector proper as will best protect the reins in the particular conditions under which it is to be used, the adjustment being readily accomplished by obvious use of the set screws 9 and movement of the protector.

Having thus described the invention what is claimed as new, is:—

A rein protector constructed of a single length of material bent to form an elongated loop for the reception of both reins, the material being projected from opposing ends of the loop in the form of rods, and connectors between said protector and the harness strap, each of said connectors including a single member bent into elongated loop form and having one terminal projected within the plane of the loop and turned upwardly at its end to form a stud arranged centrally beyond the plane of the loop, a sleeve connected to the other terminal, and a set screw coöperating with the bore of the sleeve, the sleeve bore being designed to receive one of the rods of the rein protector, and being disposed so that said rod when extended through the sleeve will underlie the loop of the connector, whereby when in place the rod of the rein protector will underlie the harness strap to assist in supporting the rein protector.

In testimony whereof I affix my signature in presence of two witnesses.

SOLOMON P. ROBERTS.

Witnesses:
  MALINDA CLEGG,
  LETHA B. ROBERTS.